Patented Sept. 11, 1951

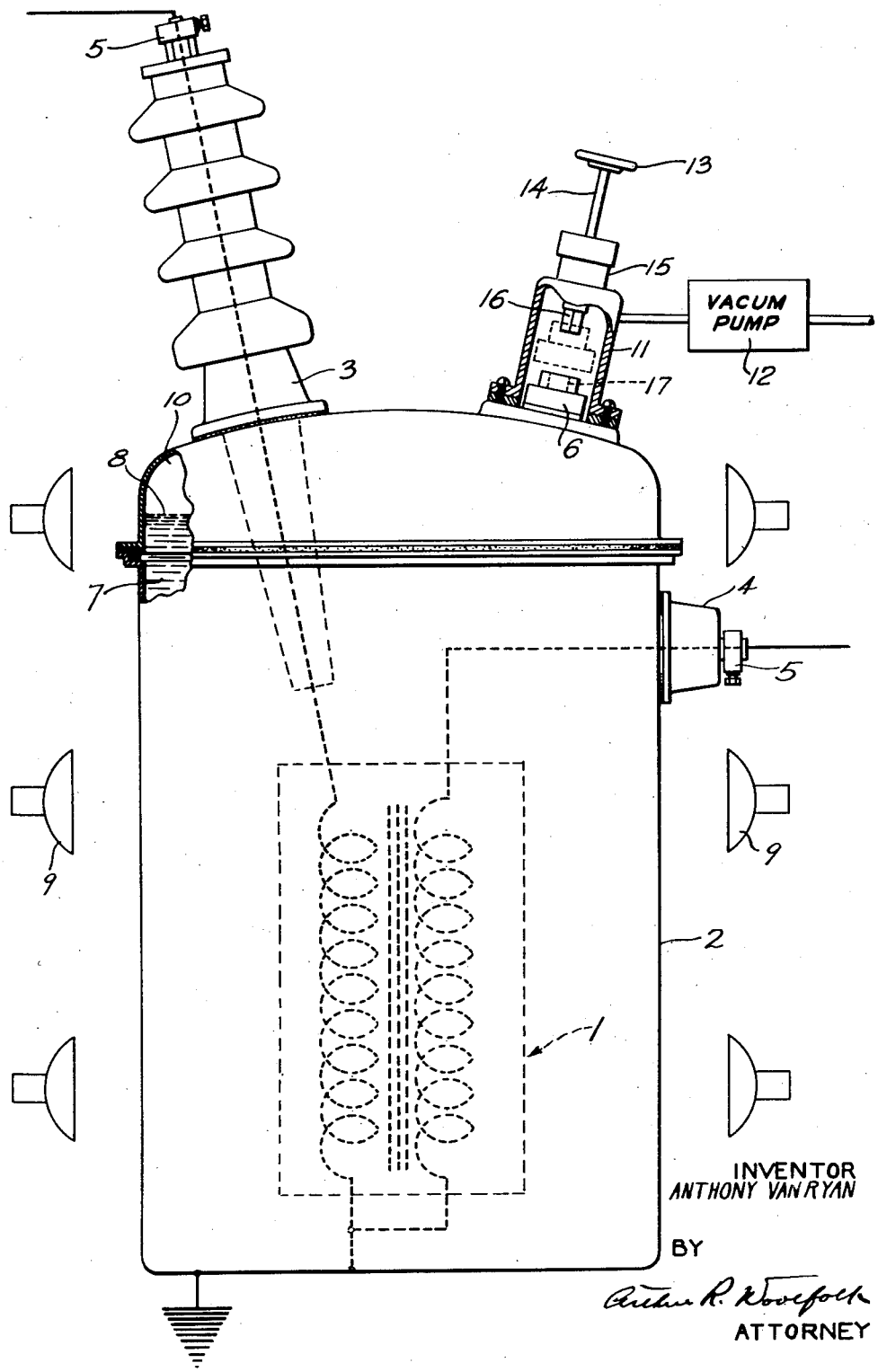

2,567,412

UNITED STATES PATENT OFFICE 2,567,412

TRANSFORMER AND METHOD OF IMPREGNATION

Anthony Van Ryan, South Milwaukee, Wis., assignor to McGraw Electric Company, a corporation of Delaware Application May 17, 1947, Serial No. 748,856

1 Claim. (Cl. 226—20.2)

This invention relates to housed transformers and the method of impregnating transformers.

Objects of this invention are to provide a housed transformer in which the casing surrounding the transformer is hermetically sealed and in which the bushings which extend through the casing are also hermetically sealed and terminate in external terminals electrically connected to the transformer and to provide a dielectric substantially filling the casing and leaving a space above the upper level of the dielectric with this space evacuated to thereby provide an hermetically sealed transformer and yet allow room for expansion of the dielectric.

Further objects are to provide a method of impregnating a transformer in an hermetically sealed casing which provides external and internal heating and maintains a vacuum after the process has been completed, the method resulting in an hermetically sealed transformer with an evacuated expansion space above the dielectric to allow for the expansion of the dielectric under operating conditions.

An embodiment of the invention is shown in the accompanying drawing, in which the single figure is a view showing diagrammatically a transformer and showing an hermetically sealed casing surrounding the transformer, such view being partly broken away.

Referring to the drawing, it will be seen that a transformer has been indicated generally by the reference character 1. This transformer is housed within an hermetically sealed metal casing 2. A transformer commonly called a single bushing type has been shown, though obviously other types of transformers could be used. The casing is provided with hermetically sealed bushings 3 and 4 terminating in externally located terminals 5 electrically connected to the transformer.

The casing is hermetically sealed also by a small cap 6 which, during the process, is left off. A dielectric, such as oil or other suitable material indicated at 7, is passed through the opening provided by the removal of the cap 6 into the casing and is allowed to substantially fill the casing to an upper level 8 spaced downwardly from the top of the casing. Thereafter the casing is evacuated through the opening provided by the removal of the cap 6 and heat is simultaneously applied to the composite structure both internally and externally. The external heat may be supplied by any suitable means such as infra-red lamps 9 and this heat will be transmitted to the dielectric. As many of these lamps as needed may be used. The internal heat is provided by electrically loading the transformer. For example, the secondary may be shorted and the primary may be supplied with current at such a voltage as not to injure the transformer but yet to load it up at least to the highest temperature at which it is intended to work under ordinary service conditions. The dielectric becomes thoroughly heated while evacuation continues. All air or other gas and all water vapor is withdrawn from the dielectric during this heating and evacuating process. This process is continued until the dielectric is thoroughly freed from all gas, air, and water vapor. While the heat and vacuum are both still applied, the cap 6 is hermetically sealed to the casing 2.

One of the many means that may be employed for replacing the cap while the vacuum is maintained in the casing is illustrated as a casing 11 which may be temporarily secured to the cover of the transformer casing 2 in any suitable manner. This member 11 is connected to a vacuum pump 12. A hand wheel 13 located externally of the casing is provided with a shank 14 which passes through a packing gland 15 and terminates in a rectangular end portion 16 located within the casing 11. The rectangular portion 16 is adapted to snugly fit within the rectangular socket 17 in the cap 6 and to hold the cap in the position shown in dotted lines in the drawing while evacuation is taking place. After evacuation is completed, the hand wheel 13 is rotated and forced downwardly so as to replace the cap and allow it to be tightly screwed back into place while the vacuum is maintained. It is to be distinctly understood that any suitable means for manipulating the cap and evacuation of the casing of the transformer could be employed as the specific details of the device form no portion of this invention.

The upper level 8 of the dielectric is, as stated hereinabove, spaced downwardly from the top of the casing 2 to provide an expansion space 10 of sufficient volume to allow for all possible expansion of the dielectric when the transformer is in actual service. This is obtained by having a space 10 at the time the dielectric is most intensely heated and by having this heating at a temperature at least equal to the highest temperature that the transformer will attain in actual service.

It will be seen that the process is a simple one to carry out and results in a transformer having an expansion space above the dielectric to take care of expansion of the dielectric when it is heated during actual service of the transformer and with this expansion space evacuated so that there will be no possible chance of contamination of the dielectric by any foreign gas or other substance.

Further it will be seen that the pressure within the casing 2 can never rise to a dangerous point but will always remain below atmospheric pressure although the dielectric may become highly heated when the transformer is heavily loaded.

Although this invention has been described in considerable detail, it is to be understood that such description is intended as illustrative rather than limiting, as the invention may be variously embodied and is to be interpreted as claimed.

I claim:

The method of impregnating a transformer housed within an hermetically sealed casing comprising providing an aperture through the casing, substantially filling the casing with a dielectric and leaving a space above the dielectric, evacuating said casing and simultaneously internally and externally heating the dielectric by electrically loading the transformer and applying heat to the outside of the casing, maintaining the temperature of the dielectric at least equal to the maximum working temperature to which the dielectric will be subjected in actual service, and hermetically sealing the aperture through the casing while the heat and vacuum are maintained.

ANTHONY VAN RYAN.

REFERENCES CITED

The following references are of record in the file of this patent:

UNITED STATES PATENTS

| Number | Name | Date |
|---|---|---|
| 1,845,116 | Apple | Feb. 16, 1932 |
| 1,976,608 | Ford | Oct. 9, 1934 |
| 2,000,438 | Dougherty | May 7, 1935 |
| 2,047,260 | Franklin | July 14, 1936 |
| 2,091,234 | Branson | Aug. 24, 1937 |
| 2,221,670 | Cooper | Nov. 12, 1940 |
| 2,298,317 | Smith | Oct. 13, 1942 |